(No Model.) 2 Sheets—Sheet 1.
W. S. COLWELL.
METHOD OF AND APPARATUS FOR OBTAINING A HIGH PRESSURE MOTOR FROM LOW PRESSURE OF STEAM IN STREET MAINS AND BRANCHES.
No. 274,175. Patented Mar. 20, 1883.
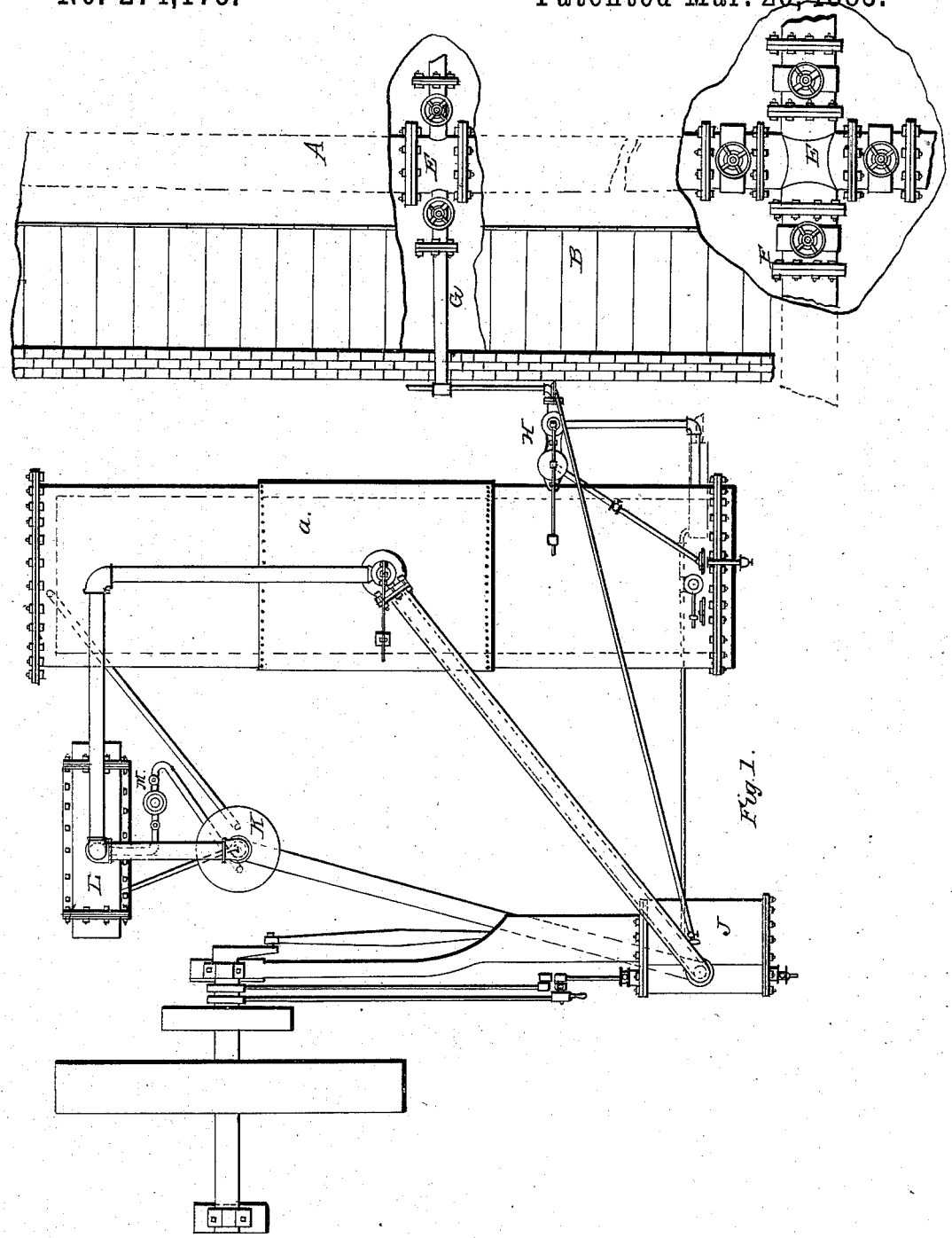
WITNESSES:
Fred. G. Dieterich
J. G. Hinkel
INVENTOR.
William S. Colwell
ATTORNEYS.
N. PETERS. Photo-Lithographer, Washington, D. C.

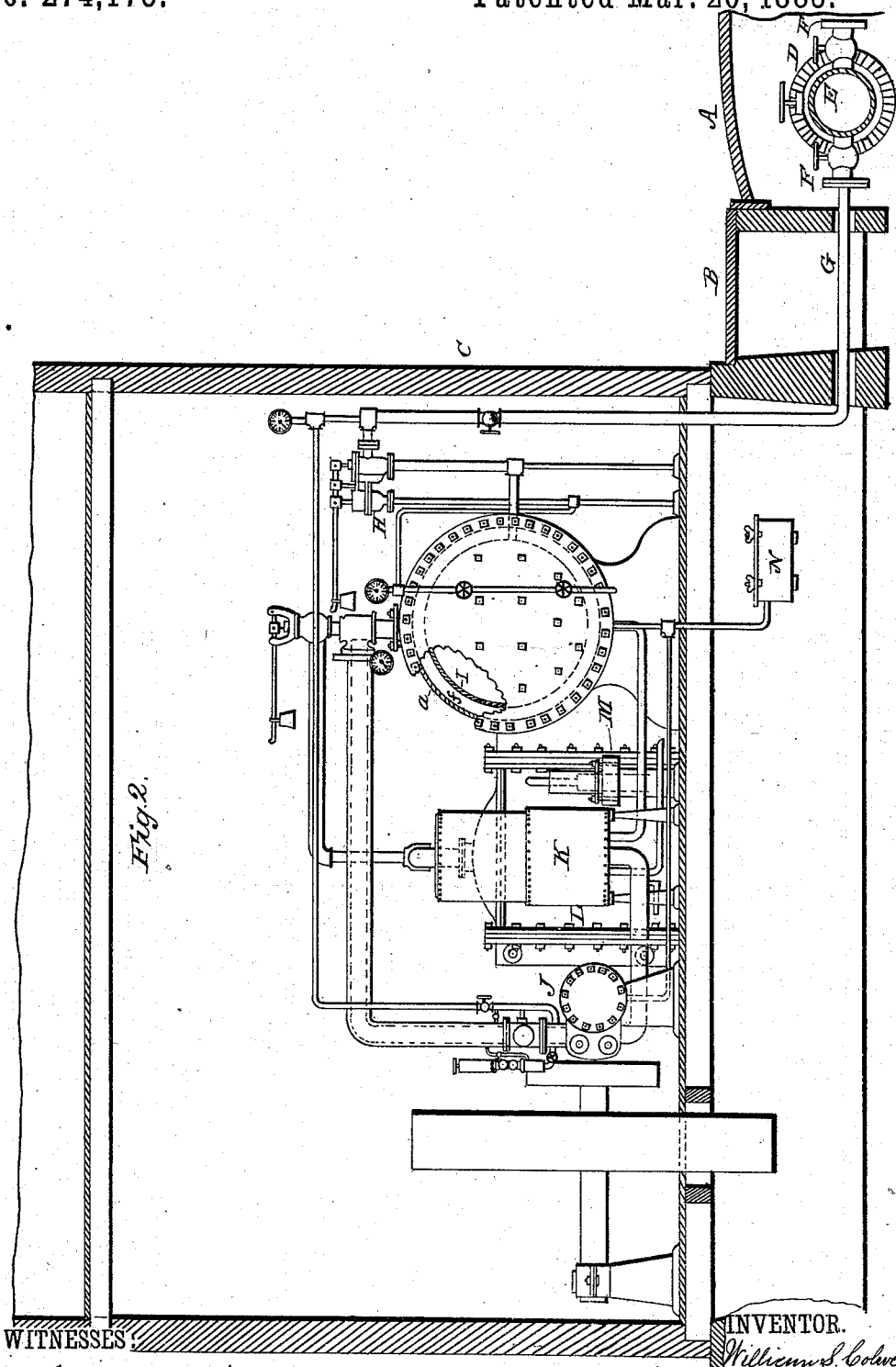

UNITED STATES PATENT OFFICE.

WILLIAM S. COLWELL, OF PITTSBURG, PENNSYLVANIA.

METHOD OF AND APPARATUS FOR OBTAINING A HIGH-PRESSURE MOTOR FROM LOW PRESSURE OF STEAM IN STREET MAINS AND BRANCHES.

SPECIFICATION forming part of Letters Patent No. 274,175, dated March 20, 1883.

Application filed August 30, 1882. (No model.)

*To all whom it may concern:*

Be it known that I, WILLIAM S. COLWELL, of Pittsburg, in the county of Allegheny and State of Pennsylvania, have invented a new and useful Improvement in Methods of Obtaining a High-Pressure Motor from Low Pressure of Steam in Street Mains and Branches; and I do hereby declare that the following is a full, clear, and exact description thereof, reference being had to the accompanying drawings, and to the letters of reference marked thereon.

In large cities and towns, for the purpose of avoiding the necessity of having thousands of steam-generators and as many different fires for the purposes of heat and power, companies and corporations have organized for furnishing people with heat for dwellings, offices, and culinary purposes, and power for the purpose of driving machinery. To this end large batteries of steam-boilers are erected at some convenient point near the main street of a city or town, and connected with said batteries of steam-boilers are mains, (large pipes,) which are placed in tunnels under the main streets, and from these mains project branches under other streets. Said mains or branches are tapped by pipes for conveying steam into the buildings where steam is desired for the purpose of heat or power.

Examples of the above arrangements for furnishing heat and power can be found in Boston, New York, Philadelphia, New Haven, and other cities of the United States, and in many of the cities of Europe. To perfect said arrangement for furnishing heat and power and overcoming the objections and disadvantages connected therewith, the highest order of engineering skill has been employed; but notwithstanding the efforts of science and engineering skill and the spending of millions of money in attempts to overcome the difficulties, dangers, objections, and disadvantages, the cause of the difficulties, dangers, disadvantages, and objections still remains—viz., the necessity of carrying a high-pressure of steam in said mains and the branch pipes connected therewith.

Now, my invention has for its object the overcoming of the difficulties, dangers, and disadvantages connected with said system of furnishing power by generating a motor by means of the heat of steam at a very low pressure in said mains and branches, as will hereinafter more full and at large appear.

To enable others skilled in the art with which my invention is most nearly connected to make and use it, I will proceed to describe its construction and operation.

In the accompanying drawings, which form part of my specification, Figure 1 is a top view of a bisulphide-of-carbon engine, representing the bisulphide-of-carbon boiler communicating with the heating and steam-supplying apparatus. Fig. 2 is a front elevation of the same, representing a vertical section of the building in which the engine is placed, and a transverse section of the tunnel and steam-main of a heating apparatus.

Reference being had to the accompanying drawings, A represents the section of a street; B, the foot-walk; C, the building in which the bisulphide-of-carbon engine is placed; D, the tunnel under the street in which the steam-main E is placed.

G represents a pipe communicating with one of the branches F of the main E, and with automatic valves H, which communicate with the bisulphide-of-carbon boiler I.

The construction and operation of the regulating-valves H are fully described in Letters Patent No. 220,220, granted to me October 7, 1879, and No. 225,689, March 23, 1880.

J represents a bisulphide-of-carbon engine, and K a heater for heating the vapor exhausted from the engine J after being condensed in the condenser L.

M is a pump for forcing the product of condensation through the heater into the bisulphide-of-carbon boiler I.

The boiler, engine, condenser, heater, and pump are connected with each other by means of pipes, as clearly indicated in the accompanying drawings. The construction of said parts separately and as a whole is fully described in said cited Letters Patent, and in an application for Letters Patent bearing even date with this application, and marked "Case A," and therefore need not be further described in this application.

The operation of my improvement is as follows: Steam is conveyed through the medium of pipe G from the main E to the automatic regulating-valves H, and from said valves by means of a pipe or pipes into a chamber, f, formed by a casing, a, surrounding the bisulphide-of-carbon boiler I, thereby surrounding said boiler with steam, the heat of which evolves the bisulphide of carbon in said boiler into a vapor, which, when the desired pressure is obtained, is conveyed to the engine by suitable pipes, and the vapor of the bisulphide of carbon, operating upon the piston of the engine, operates said engine in the manner common to the steam-engine. The exhaust from the cylinder is condensed by means of a condenser, L, and the product of condensation is forced through the heater K into the boiler I by means of the pump M. The product of the condensed steam is returned through the medium of the steam-trap N, and from it through a pipe to a force-pump, and from it into a steam-boiler.

By the combination of a bisulphide-of-carbon engine with the said heating and power supplying apparatus, and thereby utilizing the heat of the steam of the mains or branches thereof, any desired power may be obtained for operating an engine for driving machinery without the necessity of carrying a high pressure of steam in said mains and branches. This I have fully demonstrated by operating a bisulphide-of-carbon engine of fifty horse-power with the heat of steam when at a pressure of ten pounds to the square inch for driving a large amount of heavy machinery such as is common to a planing-mill having planers, circular saws, and other wood-working machines, with all of them in full operation; and I have also demonstrated that, with steam at thirteen pounds pressure to the square inch, with a bisulphide-of-carbon engine I have obtained a motor for operating an engine and driving machinery equal to that obtained for like purposes from said mains and branches when the pressure therein was eighty-nine pounds to the square inch. Therefore the necessity of and the difficulties, dangers, and disadvantages attendant upon the carrying of high pressure of steam in said mains and branches may be entirely overcome and avoided by the combination and method herein described, and a cheap, safe, and certain motor provided, which is easily manipulated, and that will operate equally well at all points connected with said heat and power supplying apparatus.

I am aware that bisulphide of carbon has been vaporized by utilizing the steam exhausted from an engine, and also that it is common to attach the steam-engine to street heat-distributing mains. Therefore I do not claim broadly the vaporizing of bisulphide of carbon by means of low-pressure steam; neither do I claim broadly attaching a steam-engine to street heating-mains or the branches thereof.

Having thus described my improvement, what I claim as of my invention is—

1. The method hereinbefore described of using the heat of low-pressure steam which is derived from the mains and branches of a heat and power supplying system, which consists in transmitting such steam and heat to a chamber inclosing a bisulphide-of-carbon boiler, and then conveying the vapor of bisulphide of carbon generated in such boiler to the engine as a motor, as and for the purpose set forth.

2. The combination of a bisulphide-of-carbon boiler and engine with the mains or with the branches of a heat and power supplying system, substantially as herein described, and for the purpose set forth.

WILLIAM S. COLWELL.

Witnesses:
A. C. JOHNSTON,
JAMES J. JOHNSTON.